ic Office 2,768,976
Patented Oct. 30, 1956

2,768,976

PROCESS OF PRODUCING TETRAACETALS OF BUTENEDIAL

Hans A. Weidlich and Werner Schulz, Ingelheim, Germany, assignors to C. H. Boehringer Sohn, Ingelheim, am Rhine, Germany, a partnership No Drawing. Application January 26, 1954, Serial No. 406,360

Claims priority, application Germany January 29, 1953

11 Claims. (Cl. 260—615)

This invention relates to an improved process of producing tetraacetals of butenedial.

Heretofore, tetraacetals of butenedial have been prepared by various, usually complicated, and expensive methods; for example, by catalytic hydrogenation of acetylene dialdehyde tetraacetals. According to said known processes, tetraethyl acetal of butenedial is obtained, for instance, from acetylene by conversion into the corresponding Grignard compound and reaction of said compound with orthoformic acid ethyl ester. Said acetylene dialdehyde tetraacetal is subsequently subjected to partial catalytic hydrogenation and yields thereby butenedial tetraethyl acetal. The known processes have the further disadvantage that the yields obtained thereby are rather small.

It is one object of this invention to provide a new and improved process of preparing tetraacetals of butenedial in an excellent yield and in a single step of reaction.

Another object of this invention is to produce tetraacetals of butenedial by reacting furan with with a halogen and the alcohol corresponding to the desired acetal under reaction conditions which lead to opening of the furan ring and the formation of tetraacetals, while avoiding cleavage of the acetal to the corresponding aldehyde.

Various other objects and advantages of this invention will become apparent as this description proceeds.

The process according to the present invention consists in principle in reacting furan under anhydrous conditions with a halogen and the alcohol corresponding to the desired acetal to be produced at a temperature not above —25° C., introducing into the reaction mixture at a temperature between about —25° C. and about 0° C. a basic agent to produce a pH value of 6.0 to 7.5, and recovering the desired tetraacetal from the reaction mixture.

The reaction proceeds according to the following reaction pattern:

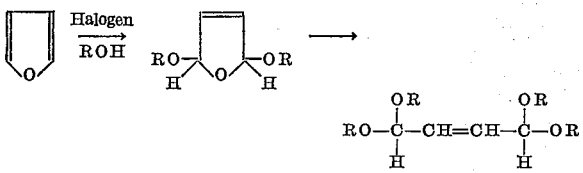

R in said formulas indicates the radical of the corresponding alcohol. Best results are obtained with aliphatic alcohols, such as methanol and ethanol mentioned in the examples, but also propanol, isopropanol, butanols, pentanols, and the like, may be used.

Our new process as outlined above allows direct production of tetraacetols of butenedial in a single step of reaction without the isolation of intermediate products, since the dialkoxy dihydrofuran which probably is formed as intermediate product, is immediately converted into the final product by the measures taken according to the present invention.

Preferably the process according to this invention is carried out in such a manner that molar amounts of furan and halogen are caused to react in a mixture of the corresponding anhydrous alcohol and advantageously in the presence of an anhydrous solvent, and under conditions whereby the reaction temperature is kept below —25° C. As soon as the reaction is completed, a basic agent, preferably ammonia, is introduced into the reaction mixture at a temperature above —25° C. and between about —25° C. and about 0° C. until the pH value of the reaction mixture is between about 6.0 and about 7.5. The basic agent used should be anhydrous and instead of ammonia other anhydrous basic agents, such as methylamine, diethyl amine, pyridine and the like, may be used, provided they are capable of binding halogen hydride formed during the reaction. Inorganic basic agents capable of binding halogen hydride which may be used are, for example, anhydrous sodium carbonate, alkali alcoholates, anhydrous alkali hydroxide, etc.

Suitable solvents for dissolving the reaction components are, for instance, anhydrous aliphatic ethers, especially diethyl ether, water-free petroleum ether, anhydrous halogeno alkanes, and other solvents indifferent to halogen.

Ammonia or other basic agents are preferably introduced at a temperature between —25° C. and —10° C. It is of advantage to continue addition of the basic agent until the solution has attained a pH value of 7.0. Thereafter, the temperature of the reaction mixture can be raised to room temperature and the mixture be worked up in the usual manner.

The yield of tetraacetals of butenedial produced according to our invention is between 60% and 85% of the theoretical, depending upon the selected alcohol. By the reaction of this invention, tetraacetals of the cis-form as well as of the trans-form of butenedial are produced in varying proportions. Said tetraacetals of butenedial are valuable intermediate products in a number of synthetic processes.

It is known (see Journal of the American Chemical Society, volume 72, 1950, pages 869 to 874, and especially page 872) to react furan with halogen and lower alcohols while cooling and to convert said furan into dialkoxy furan compounds. Said compounds are isolated from the reaction mixture by eliminating the capacity of the halogen hydride formed on said reaction to split up acetals and to cause reacetalization. In contrast to this procedure, we have discovered that we can utilize the capacity of the halogen hydride formed in said reaction to cause reacetalization for opening the furan ring and for forming the tetraacetal. The reaction conditions which we use are controlled in such a manner that further cleavage of the acetal to the corresponding aldehyde is avoided.

In the process described in said Journal, halogenation and substantial neutralization are carried out at a temperature not exceeding —25° C. At said temperature, opening of the furan ring does not take place, and thus, dialkoxy dihydrofuran compounds are obtained and can be isolated.

However, when proceeding according to the process of the present invention, i. e. when reacting furan with halogen at a temperature below —25° C. and neutralizing the resulting reaction mixture at a temperature above —25° C. and between —25° C. and about 0° C., the furan ring is opened and tetraacetals of butenedial are formed.

It is an essential feature of the present invention that after reacting furan with halogen at a temperature below —25° C., the temperature of the reaction mass is raised or is permitted to rise above —25° C. while the ammonia or other basic agent is introduced into the reaction mixture, since the halogen hydride formed during reaction of furan with halogen is capable of causing opening of the furan ring and formation of the tetraacetal at temperatures above —25° C.

The following examples serve to illustrate the present invention without, however, limiting the same thereto.

EXAMPLE I

Tetramethyl acetal of butenedial 680 g. (10 mol) of furan, 2,500 cc. of absolute methanol, and 2,000 cc. of absolute ether are placed into a 15 liter round bottom flask provided with stirrer, dropping funnel, thermometer, and gas inlet pipe. The flask and its contents are cooled to —35° C. in a large Dewar container by means of an acetone-Dry Ice (solid carbon dioxide) mixture. A solution of 1.6 kg. (10 mol) of bromine in 5,000 cc. of absolute methanol is prepared and cooled to said temperature. Said solution is added drop by drop within about 2 hours to said cooled furan solution while stirring continuously. Care is taken that the temperature during bromine addition does not exceed —25° C. After addition of the bromine solution, stirring of the reaction mixture is continued for 30 minutes, and the temperature is raised, or is permitted to rise, above —25° C. Ammonia gas is then passed into the reaction mixture until complete decolorization of the solution is achieved. The temperature during ammonia addition must be above —25° C. but should, preferably, not exceed —10° C. Introduction of ammonia is continued until the solution has attained a pH value of 7.0 determined by means of universal indicator paper.

The solution is then filtered by suction to remove ammonium bromide formed on neutralization. The filtrate is poured into 10 liters of an ice-cooled calcium chloride solution saturated in the cold. The reaction mixture is vigorously shaken with 8 to 10 liters of ether, the ethereal layer is separated from the aqueous layer, dried over sodium sulfate, and the ether is distilled off from a flask having a column provided with a Widmer spiral. The residue is subjected to fractional distillation in a vacuum. The tetraacetal distills at 92–108° C. and 13 mm. pressure.

*Yield.*—1.10 to 1.40 kg., corresponding to 60% to 80% of the theoretical yield.

EXAMPLE II

Tetraethyl acetal of butenedial 408 g. (6 mol) of furan, 2,100 cc. of absolute ethanol, 1,200 cc. of absolute ether, and a solution of 960 g. (6 mol) of bromine in 3,000 cc. of absolute ethanol are reacted and worked up as described in Example I. 910 g. to 975 g. of tetraethyl acetal of butenedial, boiling at 108° C. to 118° C. and 13 mm. are obtained.

*Yield.*—65% to 70% of the theoretical yield.

EXAMPLE III

Tetramethyl acetal of butenedial 442 g. (6.5 mol) of furan, 2,000 cc. of absolute methanol, 1,500 cc. of absolute ether, and a solution of 480 g. of chloride in 1,000 cc. of absolute methanol are reacted and worked up as described in Example I. 825 g. of tetramethyl acetal of butenedial corresponding to a yield of 70% of the theoretical yield are obtained.

In place of diethyl ether used as solvent in the examples, other halogeno alkanes may be employed, such as, for example, chloroform, carbon tetrachloride, tetrachloro ethane, etc.

While we have given certain preferred examples of our invention, it will be understood that these are for illustrative purposes only, and that various modifications and changes may be made in the application of our invention and in the materials reacted without departing from the spirit of our invention or the scope of the following claims.

We claim:

1. The method of producing tetraacetals of butenedial, which comprises reacting furan with a halogen and an alcohol corresponding to the acetal to be produced, under substantially anhydrous conditions and at a temperature not above —25° C., neutralizing the resulting reaction mixture with an alkaline neutralizing agent while the temperature of the reaction mixture is between —25° C. and about 0° C. until the pH of the reaction mixture reaches a value between 6.0 and 7.5, and separating the butenedial-tetraacetal formed thereby from the neutralized reaction mass.

2. The method of producing tetraacetals of butenedial, which comprises reacting furan with a halogen and an alcohol corresponding to the acetal to be produced, under substantially anhydrous conditions and at a temperature not above —25° C., neutralizing the resulting reaction mixture with ammonia while the temperature of the reaction mixture is between —25° C. and about 0° C. until the pH of the reaction mixture reaches a value between 6.0 and 7.5, and separating the tetraacetal of butenedial formed thereby from the neutralized reaction mass.

3. The method of producing tetraacetals of butenedial according to claim 1, wherein the halogen is bromine and wherein furan and bromine are employed in equimolar proportions.

4. The method of producing tetraacetals of butenedial, which comprises reacting furan with a halogen and an alcohol corresponding to the acetal to be produced, under substantially anhydrous conditions and in the presence of an anhydrous solvent indifferent towards halogen under the reaction conditions, at a temperature not above —25° C., increasing the temperature of the resulting reaction mixture to between —25° C. and about 0° C. while neutralizing said reaction mixture with an alkaline neutralizing agent until the pH of said reaction mixture reaches a value between 6.0 and 7.5, and separating the tetraacetal of butenedial formed thereby from said neutralized reaction mass.

5. The method of producing tetraacetals of butenedial, which comprises reacting furan with a halogen and an alcohol corresponding to the acetal to be produced, under substantially anhydrous conditions and in the presence of an anhydrous solvent indifferent towards halogen under the reaction conditions, at a temperature not above —25° C., neutralizing the resulting reaction mixture with ammonia while increasing the temperature to between —25° C. and about 0° C. until the pH of the reaction mixture reaches a value between 6.0 and 7.5, and separating the tetraacetal of butenedial formed thereby from the neutralized reaction mass.

6. The method of producing tetraacetals of butenedial, which comprises reacting furan with a halogen and an alcohol corresponding to the acetal to be produced, under substantially anhydrous conditions at a temperature not above —25° C., increasing the temperature of the resulting reaction mixture to between —25° C. and about 0° C., neutralizing said reaction mixture with ammonia until the pH of the reaction mixture reaches a value of about 7.0, and separating the tetraacetal of butenedial formed thereby from said neutralized reaction mass.

7. The method of producing tetraacetals of butenedial, which comprises reacting furan with a halogen and an alcohol corresponding to the acetal to be produced, under substantially anhydrous conditions and at a temperature not above —25° C., raising the temperature of the resulting reaction mixture to between —25° C. and about 0° C., while neutralizing the reaction mixture with an anhydrous alkaline agent until the pH of the reaction mixture reaches a value between 6.0 and 7.5, and separating the tetraacetal of butenedial formed thereby from the neutralized reaction mass.

8. The method of producing tetraacetals of butenedial, which comprises reacting furan with a halogen and an alcohol corresponding to the acetal to be produced, under substantially anhydrous conditions at a temperature not above —25° C., neutralizing the resulting reaction mixture with ammonia while increasing the temperature to between —25° C. and about —10° C. until the pH of the reaction mixture reaches a value of about 7.0, and separating the tetraacetal of butenedial formed thereby from the neutralized reaction mass.

9. The method of producing tetraacetals of butenedial according to claim 4, wherein the solvent is an anhydrous aliphatic ether.

10. The method of producing tetraacetals of butenedial according to claim 4, wherein the solvent is anhydrous petroleum ether.

11. The method of producing tetraacetals of butenedial according to claim 4, wherein the solvent is an anhydrous halogeno alykane.

References Cited in the file of this patent

UNITED STATES PATENTS 2,556,312    Young _____ June 12, 1951

OTHER REFERENCES

Fakstorp et al.: Jour. Amer. Chem. Soc., vol. 72 (1950), page 872.